Nov. 14, 1967  TADATAKA HARA  3,352,759
PROCESS FOR PRODUCING CIS-SUCCINIC ACID OF GAUCHE FORM
Filed Nov. 15, 1966  4 Sheets-Sheet 4

3,352,759
PROCESS FOR PRODUCING CIS-SUCCINIC
ACID OF GAUCHE FORM
Tadataka Hara, Tokyo, Japan, assignor to Kaken
Kagaku Kabushiki Kaisha, Tokyo, Japan, a corporation of Japan
Filed Nov. 15, 1966, Ser. No. 594,602
Claims priority, application Japan, Jan. 14, 1959,
34/534; June 6, 1959, 34/20,893
5 Claims. (Cl. 195—37)

This application is a continuation-in-part of my earlier application Ser. No. 860,227 filed on Dec. 17, 1959, now abandoned.

This invention relates to a novel and useful compound called "cis-succinic acid of Gauche form" particulary concerns a method for producing cis-succinic acid of Gauche form by fermentation and a method for deodorizing amine-containing materials by contacting them with the said cis-succinic acid of Gauche form.

Heretofore, the existence of Gauche from isomers of succinic acid have been assumed theoretically, but not confirmed. According to the studies of this inventor, it was found that commercially available succinic acid synthesized by chemical methods is mostly of trans-form and contains a small amount of cis-form. These two may be separated by their solubility difference in ether. It is also pointed out that there are different shapes of crystals in succinic acid, each being distinguishable under microscopical examination, and these are classified into two types depending on their respective shape at room temperature, i.e. α-type for needle shape and β-type for hexagonal board or short cylinder. These different crystal types are known as polymorphism and usually has a distinct transition point at which one crystal type can be transformed into the other type. Ordinarily, succinic acid is believed to have no transition point, but the present cis-succinic acid of Gauche form possesses a distinct transition point. As described hereinabove, commercial succinic acid is the mixture of trans-form and a small amount of cis-form (α-type and β-type). The β-type crystal is stable at relatively lower temperature while the α-type crystal is stable at relatively higher temperature.

Dupré La Tour reported in "Compt. Rend," vol. 193, page 180 (1931) that when β-type succinic acid is heated at 138° C., this crystal is converted to α-type and at the same time cis-form acid is produced, and therefore the transition point of succinic acid is 138° C. However, the inventor examined the properties of commercially available succinic acid and found that the trans form succinic acid cannot be converted to the cis-form by mere heating, but can be converted to α-type from β-type when it is first molten at 186° C. and subsequently cooled to precipitate crystals, accordingly, the distinct transition point cannot be observed. On the other hand, it was also found that the pure cis-form succinic acid possesses a considerably clear transition point from β- to α-type crystals.

The following important facts were also found by the inventor. That is, the crystal shape of this substance is in general hexagonal board or short cylinder at a room temperature. Upon heating, it is completey sublimed at 147–155° C., but its original shape is still maintained after said sublimation. Continuing the heating, the compound, however, suddenly changes into long cylindrical shape at 156–157° C. From these findings, the inventor ratiocinated that this long cylindrical shape must be the α-type succinic acid.

In the chemical field, it is well known that some chemicals possess optical activity even if they have no asymmetrical carbon atom. For example, dichloroethane having the formula

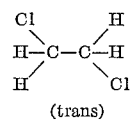
(trans)

carries no asymmetrical carbon atom, but the intramolecular rotation therein is somewhat restricted by the presence of two chlorine atoms and the free rotation is settled down at positions where the rotation potential is minimal. Thus, the trans-dichloroethane possesses the rotational isomers having one $CH_2Cl$ turned by $\pm 120°$ around the axis C—C. These rotational isomers are often called "Gauche form" isomers.

Since succinic acid is represented by either of the following formulae quite similar to that of dichloroethane.

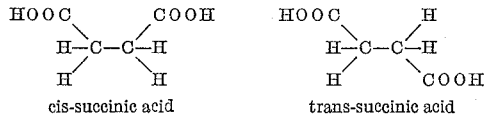

cis-succinic acid      trans-succinic acid

Such "Gauche form" isomers are assumed theoretically, but they have not been confirmed up to the time.

The present inventor has discovered that a Gauche form isomer closely related to the cis-type succinic acid can be prepared together with cis-succinic acid by fermentation with a strain of Saccharomyces genus. These two, i.e. cis-type and new Gauche form, are obtained as a mixture, but can hardly be separated from each other because of the similarity in their respective physical and chemical properties. However, this product apparently differs from the existing succinic acids, i.e. trans-form, in many respects as described below, and possesses an outstanding characteristic activity to remove the offensive odor derived from amines. The terms "cis-succinic acid of Gauche form" used herein refers to "the product obtained by the present method."

Accordingly, an object of the present invention is to provide a process for preparing a new and useful compound called cis-succinic acid of Gauche form, particularly by fermentation. Another object of the invention is to provide a method for deodorizing amine-containing materials by contacting them with the said cis-succinic acid of Gauche form. Other objects, features, capabilities and advantages comprehended by the present invention will be apparent from the description and claims which follow.

Referring to the drawings.

Figure 1:
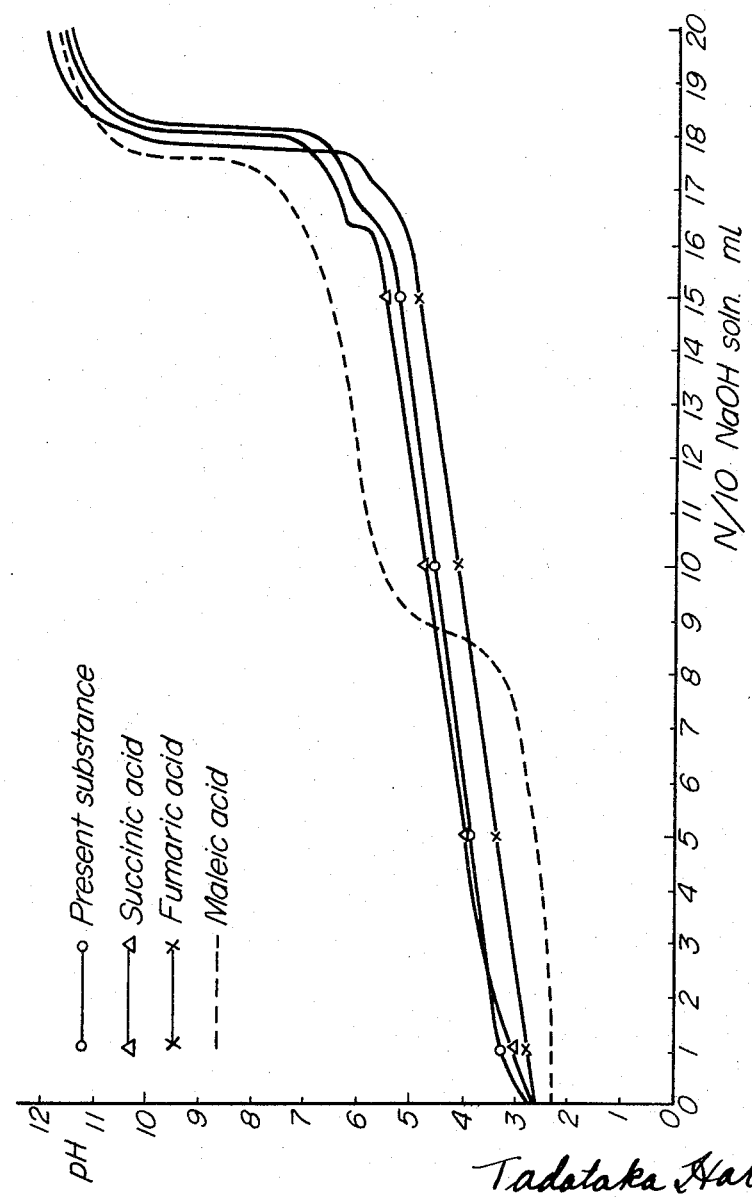
FIG. 1 is a curve of the titration of β-cis-succinic acid of Gauche form, with N/10 sodium hydroxide aqueous solution.

This new compound, cis-succinic acid of Gauche form, can be formed by growing the microorganism, *Saccharomyces steineri* var. *hara* in a suitable nutrient medium under appropriate stationary or submerged aerobic (viz. shaken) conditions. This strain, which we have isolated from home-made fermented grape juice, and which we designate as *Saccharomyces steineri* var. *hara*, is so similar in cultural characteristics to a strain of *Saccharomyces steineri* with minor exceptions that I consider it to be belonging to the same species with *Saccharomyces steineri*. A culture of the living microorganism has been deposited with and is available from the American Type Culture Collection; it has been designated as ATCC No. 13668.

The strain was isolated from the fermented grape juice, and the method of isolation is as follows:

Well washed grape was milled and then placed in a sterile flask with cotton-seal. Fermentation was carried out at 25° C. for 3 to 4 days. During this period, the flask was stirred by shaking twice a day. At the end of fermentation, a fermentation liquor was taken by a platinum loop and was inoculated to malt agar plate. The plate was incubated at 25° C. for 48 hours. On the plate surface, the pale yellow, creamy colonies of the desired *Saccharomyces steineri* var. *hara* and the white, filmy wrinkled colonies were formed, the former colonies being collected to provide the desired microorganism.

The present invention will be described with particular reference to the above-mentioned strain of the organism, but it is to be understood that the fermentative processes of this invention embrace not only the use of *Saccharomyces steineri* var. *hara* but also other "Gauche" form cis-succinic acid-producing strains of Saccharomyces genus, such strains being readily produced and isolated by routinely applied isolation and strain-modification methods which include selection of cultured organisms, and exposure of organisms to modifying means such as X-ray, ultraviolet light, and chemical agents, for example, nitrogen mustards. Illustrative examples of other Gauche form cis-succinic acid-producing strains are *Saccharomyces cerevisiae*, *Saccharomyces cerevisiae* var. *ellipsoideus*, and *Saccharomyces willianus*.

*Saccharomyces steineri* var. *hara* (ATCC No. 13668) is characterized by the physical, cultural, and physiological tests set forth in the following table and paragraphs.

Growth on malt juice

This strain *Saccharomyces steineri* var. *hara* shows good vegetative growth on malt juice at 25° C. After three days' incubation, oval or elongate cells each having $(3.0–7.0) \times (5.0–12.0)\mu$ in size are obtained. Usual proportion of length to width of the cell is 1:2, but some variety is observed. Each cell has the activity of budding and forms white colored deposits in the culture medium. No film formation is observed.

Growth on malt juice

The growth of the strain on malt agar is just equal to that on malt juice. There is no significant difference in shape and size of cells. The colonies of the strain are round, semi-glossy, light yellow-white color creamy.

After cultivations of the slant culture for one month, the colonies are found to be yellowish-white colored, creamy soft semi-glossy and smooth, not wrinkled.

*Slide culture.*—Pseudomycelium is not found. (An original strain of *Sacch. steineri*, and strains of *Sacch. cereviciae*, *Sacch. cereviciae* var. *ellipsoideus* and *Sacch. willianus* are different from each other in their shape, and therefore the present strain can be macroscopically distinguished from them.)

*Sporulation.*—Spores are readily formed on malt agar. Usually an ascus contains four round escospores. In this point the present strain is differed from an original strain of *Sacch. steineri.*

Fermentation of various sugars

The present strain *Saccharomyces steineri* var. *hara* shows the following fermentative activity to various sugars.

Glucose ------------------------------------ +
Galactose ---------------------------------- +
Maltose ------------------------------------ +
Saccharose --------------------------------- +
Lactose ------------------------------------ −
Raffinose ---------------------------------- −

Assimilation of potassium nitrate

Potassium nitrate is not assimilated by this strain.

Decomposition of arbutin

This strain does not decompose arbutin. The comparative table with respect to the present strain and other assembling known yeast is as follows:

| | Shape of the cell | Size of the cell | Sediment formation | Ring formation | Pseudomycelium | Sporulation | Fermentation | | |
|---|---|---|---|---|---|---|---|---|---|
| | | | | | | | Glucose | Maltose | Galactose |
| The present strain. | Oval to elongate. | | + | + (thin or no). | + tree-like. | Round, mostly 4/ascus. | + | + | + |
| *Saccharomyces steineri*. | Oval to long-oval. | $(3–8) \times (5–14)\mu$ | + | + (thin) | + tree-like. | Round 2–4/ascus mostly 2. | + | + | + |
| *Sacch. willianus*. | Oval to elongate. | $(2.2–5.5) \times (6–14–33)\mu$ $(3–6.5) \times (6.5–14–23)\mu$ $(4–7) \times (8–16–22)\mu$ | + | + | + tree-formation. | Round or oval 1–4/ascus. | + | + | + (weak) |
| *Sacch. cere. var. ollipsoideus*. | Oval to long-oval. | $(3.5–9.5) \times (6–14–20)\mu$ $(2.5–6) \times (3.5–13)\mu$ $(3–7.5) \times (5–14)\mu$ | + | + | + (poor). | Round or oval 1–4/ascus. | + | + | + |
| *Sacch. cerevisize*. | Round, short-oval or oval. | $(5–10) \times (6–12)\mu$ $(3–7) \times (4.5–10)\mu$ $(3.5–8) \times (5–15)\mu$ | + | ± | +, − (one third of the strain). | Round or slightly oval 1–4/ascus. | + | + | + (weak or −) |
| *Sacch. pastorianus*. | Oval, elongate or sausage-shapes. | $(2.5–4) \times (7–26)\mu$ | + | + | + tree-formation. | Round 1–4/ascus. | + | + | − |
| *Sacch. carlsberganisis*. | Round, short-oval or oval. | $(5–10) \times (5–13)\mu$ $(4–8.5) \times (5–15.5)\mu$ | + | + | − usually, + (elongate cells). | Round 1–4/ascus. | + | + | + |
| *Sacch. heterogenious*. | Oval to long-oval. | $(3–6) \times (6–12)\mu$ | + | + | + tree-like. | Round 1–4/ascus. | + | + | − |
| *Sacch. italicus*. | Oval to long-oval. | $(4–8) \times (5–15)\mu$ | + | + | + (primitive). | Round 1–4/ascus. | + | + | + |

|  | Fermentation ||| Sugar assimilation ||||| Assimilation of potassium nitrate | Ethanol as sole source of carbon | Splitting of arbutin |
| --- | --- | --- | --- | --- | --- | --- | --- | --- | --- | --- | --- |
|  | Lactose | Saccharose | Raffinose | Glucose | Maltose | Galactose | Lactose | Saccharose |  |  |  |
| The present strain. | − | + | − | + | + | + | − | + | Absent. | No growth. | Absent. |
| *Saccharomyces steineri.* | − | + | − | + | + | + | − | + | Absent. | No growth. | Absent. |
| *Sacch. willianus.* | − | + | +⅓ | + | + | + | − | + | Absent. | No growth or weak growth. | Absent. |
| *Sacch. cere. var. ellipsoideus.* | − | + | +⅓ | + | + | + | − | + | Absent. | Usually no growth weak or normal growth. | Absent. |
| *Sacch. cerevisiae.* | − | + | +⅓ | + | + | + (weak) | − | + | Absent. | Usually no growth occasionally weak or normal growth. | Absent. |
| *Sacch. pastorianus.* | − | + | +⅔ | + | + | − | − | + | Absent. | No growth. | Absent. |
| *Sacch. carlsbergenisis.* | − | + | + (complete) | + | + | + | − | + | Absent. | No growth. | Absent. |
| *Sacch. heterogenicus.* | − | + | − | + | + | − | − | + | Absent. | No growth. | Absent. |
| *Sacch. italicus.* | − | − or weak | − | + | + | + | − | + | Absent. | No growth. | Absent. |

The classification and diagnosis are performed based upon "The Yeasts" a toxonomic study by J. Lodder and N. J. W. Kreger—Van Rij North-Holland Publishing Co., Amsterdam (1952).

As the result of the tests stated, the present strain has been identified as a new strain of *Saccharomyces steineri*. Analogous strains include *Sacch. cereviciae*, *Sacch. steineri*, *Sacch. ellipsoideus*, *Sacch. willianus*, etc. In the fermentative activity for raffinose, this strain is similar to *Sacch. steineri*, and differed from the strains of other species. This strain forms two ascopores in ascus, while the original strain of *Sacch. steineri* usually forms four ascopores.

In the present invention, grape juice or malt juice may be used as culture medium. Malt juice is rather preferred because it is readily commercially available. Of course other culture media including cane sugar juice, Henneberg's synthetic medium, etc., can be used to produce β-cis-succinic acid of Gauche form.

Table 1 shows the result of fermentation tests using shaking culture at 27° C. for 72 hours. A series of these tests was carried out for determining the usefulness of various culture media.

TABLE 1

| Culture medium | Deodorization effect | Before cultivation || After cultivation ||
| --- | --- | --- | --- | --- | --- |
|  |  | Sugar contained | pH | Sugar contained | pH |
|  |  | Percent |  | Percent |  |
| Grape juice | ++ | 15 | 3.5 | 4.6 | 2.5 |
| Malt juice | ++ | 15 | 5.0 | 4.0 | 3.2 |
| Henneberg's synthetic medium (Nitrogen source): |  |  |  |  |  |
| Peptone | + | 15 | 7.0 | 8.8 | 4.0 |
| Asparagine | ± | 15 | 7.0 | 9.5 | 5.6 |
| Ammonium sulfate | − | 15 | 7.0 | 9.8 | 5.8 |
| Ammonium nitrate | ± | 15 | 7.0 | 9.7 | 5.8 |
| Ammonium chloride | ± | 15 | 7.0 | 9.2 | 4.8–5.0 |
| Sodium nitrate | − | 15 | 7.0 | 12.4 | 6.4–6.2 |

Table 2 shows the result of fermentation tests using standing culture at 27° C. for 14 days. A series of these tests was carried out for determining the usefulness of various culture media.

TABLE 2

| Culture medium | Deodorization effect | Before cultivation || After cultivation ||
| --- | --- | --- | --- | --- | --- |
|  |  | Sugar contained | pH | Sugar contained | pH |
|  |  | Percent |  | Percent |  |
| Grape juice | ++ | 15.0 | 3.5 | 8.5 | 3.0 |
| Malt juice | ++ | 15.0 | 5.0 | 9.0 | 4.0 |
| Henneberg's synthetic medium (nitrogen source): |  |  |  |  |  |
| Peptone | + | 15.0 | 7.0 | 13.0 | 5.4 |
| Asparagine | ± | 15.0 | 7.0 | 14.0 | 6.2 |
| Ammonium sulfate | − | 15.0 | 7.0 | 14.0 | 7.2–6.8 |
| Ammonium nitrate | ± | 15.0 | 7.0 | 14.6 | 6.4 |
| Ammonium chloride | ± | 15.0 | 7.0 | 14.0 | 6.0 |
| Sodium nitrate | − | 15.0 | 7.0 | 14.8 | 7.0–6.8 |

With respect to cultivation method of the present invention, any of standing culture, shaking culture, submerged aerated culture, etc. may be employed to form β-cis-succinic acid of Gauche form. However, when aerobic cultivation such as shaking culture and submerged aerated culture is employed, the time required for cultivation is highly minimized. Accordingly, such methods are more preferably used for the purpose of the invention as compared with stationary cultivation methods. Under aerobic conditions, the cultivation may be successfully carried out at about 20° to 30° C. for about 72–96 hours. When stationary conditions are applied to cultivation, it should be carried out at about 20° to 30° C. for about 14–21 days.

TABLE 3.—STANDING CULTURE TEST

| Medium | Temp., °C. | 0 day | | 7 days | | 14 days | | 21 days | |
|---|---|---|---|---|---|---|---|---|---|
| | | Sugar | pH | Sugar | pH | Sugar | pH | Sugar | pH |
| Grape juice | 27-30 | Percent 14.6 | 3.5 | Percent ±7.9 | 3.0 | Percent +6.4 | 2.7 | Percent ++4.6 | 2.5 |
| | 15-20 | 14.6 | 3.5 | −8.2 | 3.2 | ±7.2 | 3.0 | +6.6 | 2.8 |
| | 5 | 14.6 | 3.5 | −9.4 | 3.4 | ±7.6 | 3.2 | +7.4 | 3.0 |
| Malt juice | 27-30 | 13.2 | 5.0 | −8.6 | 3.4 | +5.4 | 3.0 | ++3.2 | 2.7 |
| | 15-20 | 13.2 | 5.0 | −9.6 | 3.8 | ±7.4 | 3.2 | +4.0 | 2.9 |
| | 5 | 13.2 | 5.0 | −11.4 | 4.6 | −10.0 | 4.0 | ±8.6 | 3.8 |

TABLE 4.—SHAKING CULTURE TEST

| Medium | Temp., °C. | 0 hr. | | 24 hrs. | | 48 hrs. | | 72 hrs. | |
|---|---|---|---|---|---|---|---|---|---|
| | | Sugar | pH | Sugar | pH | Sugar | pH | Sugar | pH |
| Grape juice | 27 | Percent 15.0 | 3.5 | Percent ±12.0 | 2.5 | Percent ++5.0 | 2.5 | Percent ++4.6 | 2.5 |
| Malt juice | 27 | 15.0 | 5.0 | ±5.4 | 3.7 | ++5.2 | 3.4 | ++4.2 | 3.2 |

TABLE 5.—COMPARATIVE TEST FOR SHAKING CULTURE USING VARIOUS STRAINS

| Strain | 0 hr. | | 12 hrs. | | 24 hrs. | | 48 hrs. | | 72 hrs. | |
|---|---|---|---|---|---|---|---|---|---|---|
| | Sugar | pH | Sugar | pH | Sugar | ph | Sugar | pH | Sugar | pH |
| Sacch. steineri var. hara | Percent 13 | 5.0 | Percent −12.2 | 4.6 | Percent ±5.4 | 3.7 | Percent ++3.1 | 3.1 | Percent ++2.8 | 3.0 |
| Sacch. steineri | 13 | 5.0 | −12.9 | 4.8 | ±6.5 | 4.0 | +4.0 | 3.8 | ++4.0 | 3.8 |
| Sacch. c.v. ellipsoideus | 13 | 5.0 | −12.8 | 4.8 | ±6.6 | 3.9 | +4.6 | 3.9 | ++4.0 | 3.8 |
| Sacch. cereviciae | 13 | 5.0 | −12.9 | 4.9 | −10.1 | 4.0 | −10.0 | 4.0 | ±10.0 | 4.2 |

In Tables 3 and 4, both tests were carried out using a strain *Saccharomyces steineri* var. *hara* (ATCC No. 13668). In Table 5, the tests were carried out at 27° C., using malt juice medium. In each of the above tables, signs (−), (±), (+) and (++) indicate the degree of deodorization effect.

In carrying out the invention in effect, the culture solution obtained by cultivation stated above is extracted with ether, and then the ether is removed from the extract. The remaining part is further concentrated to yield crude crystal of Gauche form β-cis-succinic acid. The crude product can be recrystallized from hot ether to give pure crystal.

Thus, the Gauche form succinic acid can be prepared economically by the fermentation with a strain *Saccharomyces steineri* var. *hara* (ATCC No. 13668) and by an ether extraction of the culture solution obtained. The inventor has further discovered that the above said ether extract contains a useful enzyme like yellow substance, that is, the water solution of commercially obtainable succinic acid and maleic acid were changed to the β-cis-succinic acid of Gauche form by contacting with above yellow substance under light shielding conditions.

Firstly an enzyme like substance containing liquor is prepared by evaporating the solvent from the above said ether extract. A mixture of equal amounts of known, commercially available succinic acid (optical isomer) and maleic acid or maleic anhydride is dissolved in twice the amount of distilled water under heating. After cooling to a temperature below 50° C., the resulting solution is combined with the enzyme like substance containing liquor under day-light shielding conditions. The resulting mixture is concentrated under reduced pressure to yield crude crystal of β-cis-succinic acid of Gauche form.

According to the method described herein, almost 90% of the total weight of the succinic acid and maleic acid employed can be converted to the Gauche form succinic acid.

With respect to the production of β-cis-succinic acid of Gauche form, typical procedures used for carrying out the invention will be described in the following paragraphs.

*Cultivation of* Sacch. steineri *var.* hara

Two hundreds milliliters of malt juice was charged into a 500 cc.-volume Sakaguchi flask and then sterilized with heat at 120° C. for 20 minutes. After cooling, a strain *Sacch. steineri* var. *hara* was planted to the flask. Before cultivation, malt juice preferably had a pH of 4.6 to 5.6 and a sugar content of 15 to 17%. Cultivation temperature was 25° ±5° C. and cultivation period was 72 to 120 hours. During cultivation, the flask was shaken by means of a reciprocating type shaking machine which was reciprocated 120 times per minute with an amplitude of 8 cm. After cultivation, the culture solution was found to have a pH of 2.8 to 3.2 and a sugar content of 3 to 4%.

*Extraction of β-cis-succinic acid of Gauche form from culture solution*

From the culture solution obtained by cultivation stated, mycelia were removed by filtration. The filtrate, charged into an automatic liquid extractor, was extracted with ether over 36 to 48 hours. An ether fraction was recovered, and the ether was removed under reduced pressure. The remaining part was further concentrated whereby crude crystal of β-cis-succinic acid of Gauche form was yielded. This crude crystal had yellow color and characteristic fermentative odor. From one liter of culture solution, about one gram of crude crystal was obtained.

The crude crystal thus obtained was dissolved into a small amount of hot ether, and filtrate with small amount of carbon powder, and then cooled in order to recrystallization. Repeating recrystallization, about 500 mg. of pure crystal were obtained from about one gram of the crude one.

Similarly β-cis-succinic acid of Gauche form was extracted from a culture solution which was obtained by cultivation of the other strains of Saccharomyces genus than *Sacch. steineri* var. *hara* such as referred to above. In this case, 140 to 400 mg. of pure crystal was recovered from one liter of the culture solution.

*Extraction of an enzyme like subst. containing liquor from the culture solution*

From the culture solution, mycelia were removed by filtration. By means of an automatic liquid extractor, the filtrate was extracted with ether for 36 to 48 hours. An ether fraction was recovered, and the ether was removed under reduced pressure. The remaining part was a brown colored liquid containing β-cis-succinic acid of Gauche form together with the yeast used. This liquor (including the said yellow substance) was recovered in an amount of about 5 cc. from one liter of the culture solution.

*Synthetic procedures using the enzyme like yellow substance-containing liquor*

A mixture of equal amounts of known, commercially available succinic acid and maleic acid (or maleic anhydride) was dissolved in twice amount of distilled water or of less than 50% ethanol solution with heat. After cooling below 50° C., the resulting solution was combined with the above extracted enzyme like yellow substance which was in such amount as corresponding to more than 20% by weight of the said solution. While shielding from day light, the resulting mixture was concentrated under reduced pressure of less than 20 mm. Hg, whereby crude crystal of β-cis-succinic acid of Gauche form was yielded. The crude crystal could be recrystallized in the same manner mentioned above.

It should be noted that any other solvent than ether cannot be used for the recovery of Gauche form cis-succinic acid from the culture solution because such solvent cannot dissolve selectively the desired substances, and in the present, therefore, ether should be critically used for the extraction of the substances.

The cis-succinic acid of Gauche form of the present invention is characterized by the physical, chemical and physiological properties set forth in the following paragraphs.

*Melting point*

Melting points of the present compound and the commercial succinic acid were determined macroscopically as follows:

Sample was sealed in a capillary and heated comparatively lapid in sulfuric acid bath.

```
                                                      ° C.
The present compound (β form) M.P. _____ 183 to 184
Succinic acid, commercially available _____ 185 to 186
Mixed sample of the above two _____ 184 to 185
```

Then a melting point of the present compound was determined by micro method, and the following changes were observed:

Room temp. (hexagonal board or short cylinder shaped crystal)
→Sublimation point (147°–156° C.) (Crystal shape unchanged; β-form)
→156°–157° C. or above (Needle shaped crystal; α-form)
→Melting (196°–197° C.)

In the above changes the point of 156°–157° C. seemed to be the metastasis point (transition point) (β-succinic acid to α-succinic acid). But Dupré La Tour said that the transition point observed is 138° C.

Thus, in a micro-method employing a small amount of fine crystals and heating very carefully, all of the crystals tested were sublimated at a temperature below 156° C. to give anhydride of Gauche form succinic acid, while the commercial succinic acid had no sublimation at the same temperature.

Gauche form succinic acid: (β-type crystal)

$$\xrightarrow[147° C.\ \ 156° C.]{\text{sublime}} \text{(anhydride; β-type crystal)}$$

$$\xrightarrow[156° C.]{} \text{(α-type crystal)} \longrightarrow \text{(melt at 196°–197° C.)}$$

Commercial succinic acid; (β-type crystal)

$$\xrightarrow{\text{don't sublime}} \text{(melt at 186° C.)} \xrightarrow{\text{cool}} \text{(α-type crystal)}$$

*Determination of molecular weight*

Molecular weight of the substance was determined according to Akiya and Berger's method. Alcohol was used as solvent and azobenzene as known control. As the result, it was found that the molecular weight of the substance was approximately 120.

*Elementary analysis*

Elementary analysis of this substance showed that the substance contained 40.83% of carbon, 5.14% of hydrogen and 54.03% of oxygen, but not nitrogen and halogen. See Table 6.

TABLE 6.—ELEMENTARY ANALYSIS

| | C | H | $N_2$ | N |
|---|---|---|---|---|
| | Percent | Percent | Cc. | Percent |
| The present substance | 40.83 | 5.14 | 0 | 0 |
| Succinic acid, commercially available | 40.68 | 5.12 | 0 | 0 |
| Maleic acid | 41.39 | 3.47 | 0 | 0 |

*Acid titration and the curve thereof*

An aqueous solution of this substance was titrated with N/10-NaOH aqueous solution, and as its result the molecular weight was found to be about 119. Further such titration was repeated using an electric automatic titration apparatus, and the data were plotted on a titration curve. The present substance gave the similar titration curve to that of known succinic acid, and was found to be dicarboxylic acid. (See FIG. 1.)

*Qualitative test of carbonyl group*

The precipitation reaction using 2,4-dinitrophenyl hydrazine was carried out for determining whether carbonyl group was present or not in the substance. It was found that the present substance had not C=O group.

*Qualitative test of hydroxyl group*

As the result of diazo color reaction, it was found that the present substance did not contain hydroxyl group.

*Qualitative test of ethylenical double bond*

The decolorization reaction of an aqueous solution of this substance by a potassium permanganate aqueous solution, and the decolorization reaction of a glacial acetic acid solution of this substance by a glacial acetic acid solution of bromine were tested, and in both cases decolorization was not observed. It was found that this substance had not an ethylenical double bond (C=C).

*Solubility to various organic solvents*

This substance has a relatively lower solubility in water, ethanol or ether, than that of a known, commercially available succinic acid. Also this substance is slightly soluble in benzene and chloroform, and unsoluble in petroleum ether and carbon tetrachloride.

| Solvents | Water | Ethanol | Methanol | Ether | Chloroform |
|---|---|---|---|---|---|
| Substances: | | | | | |
| Present substance | 25.0 ml | 20.0 | 10.0 | 200 | Non. |
| Succinic acid | 13.0 | 18.5 | 6.3 | 113 | Non. |
| Maleic acid | Freely | Freely | Freely | Slightly | |
| Fumaric acid | 158.7 | 52.0 | 32.0 | 140 | Non. |

(One gram of samples were dissolved at 20° C. and one atmosphere pressure.)

Specific rotation

This substance (β-form) and the polymorph thereof and a known, commercially available succinic acid were measured of their specific rotation:

The present substance

|  | $[\alpha]D$ |
|---|---|
| (β-form) (1% aq. soln.) | 18.1° |
| (α-form) (1% aq. soln.) | 18.4° |

Commercially available succinic acid
(1% aq. soln.) _____ −1.7°

The brucine salt of this substance reacted at room temperature and that of a known succinic acid were measured of their specific rotation.

|  | $[\alpha]D$ |
|---|---|
| Brucine salt of this substance (1% aq. soln.) | −19.3° |
| Brucine succinate, commercially available (1% aq. soln.) | 32.3° |

Ultra-violet absorption

Figure 2:
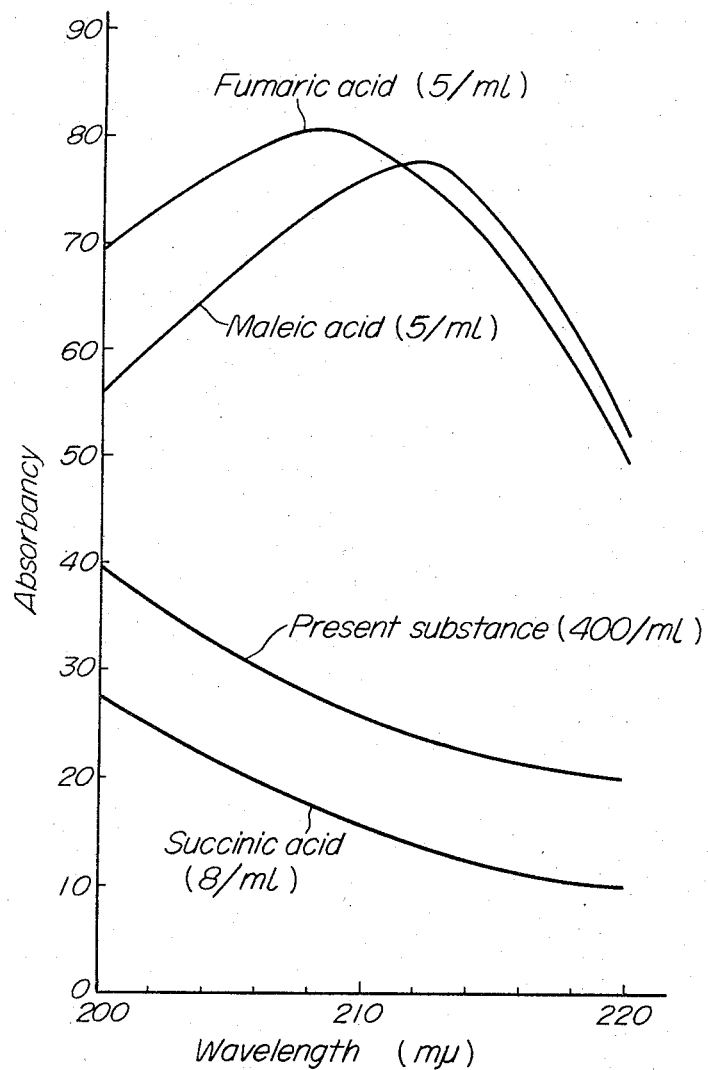
FIG. 2 is a curve of the ultra-violet spectrum of β-cis-succinic acid of Gauche form.

In this test, an aqueous solution of this substance (1 mg./10 cc.) was used as sample. For contrast, known succinic acid, maleic acid and fumaric acid were employed. As shown in FIG. 2, the ultra-violet absorption spectrum of the substance shows only one maximum at 200 mμ, while those of succinic, maleic and fumaric acids show one maximum at 210 mμ, 212 mμ and 208 mμ, respectively.

Infra-red absorption

Figure 3:
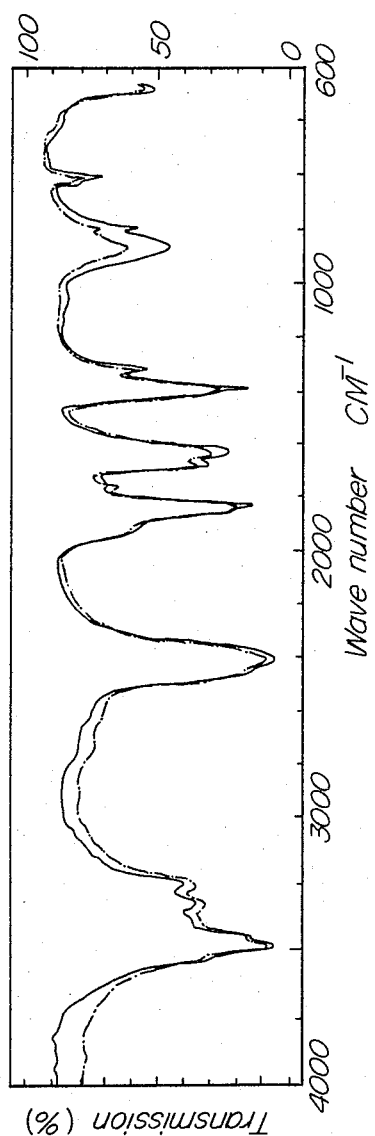
FIG. 3 is a curve of the infra-red spectrum of β-cis-succinic acid of Gauche form.
Figure 4:
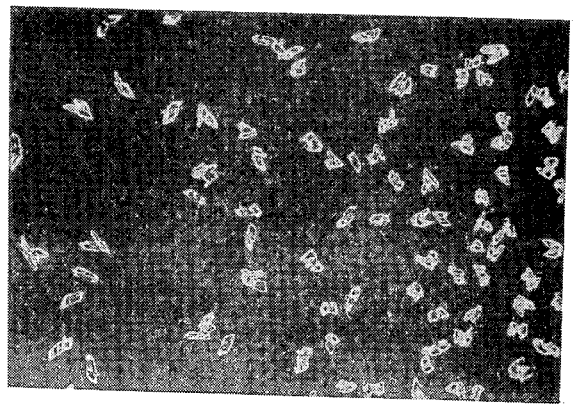
FIG. 4 is crystals of β-cis-succinic acid of Gauche form.
Figure 5:
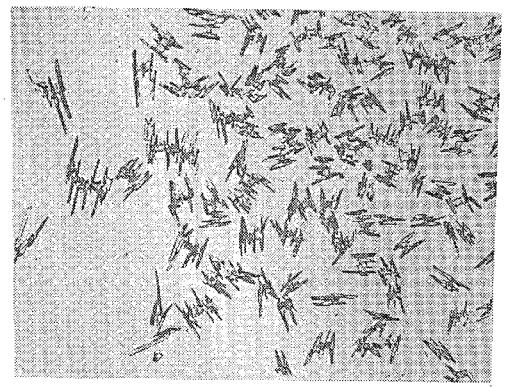
FIG. 5 is crystals of α-cis-succinic acid of Gauche form.

The infra-red absorption spectrum of this substance is entirely similar to that of a known, commercially available succinic acid, as seen in FIG. 3.

Anhydride of β-cis-succinic acid of Gauche form

The substance (β-cis-succinic acid of Gauche form) is completely sublimated at temperatures between 147° and 156° C. thereby to convert it into its anhydrous form. Such anhydrous substance is characterized in that the infra-red absorption spectrum thereof shows absorption bands at wave length: 1780 and 1875 m.$^{-1}$. This anhydrous substance when dissolved into water, immediately is converted into dicarboxylic acid by ring opening.

Reactivity test with other compounds

When a 1 N aqueous solution of this substance is added with a 1 N ammonia solution, a chemical reaction takes place immediately at room temperature whereby asparagine and aspartic acid are formed. Commercially available succinic acid does not react with ammonia at a room temperature.

Rf values on paper chromatogram

The following data show the Rf values of the substance and other various known organic acids, which are determined by one dimensional paper-chromatogram.

TABLE 7

| Acid | Rf value | | |
|---|---|---|---|
|  | Run No. 1 | Run No. 2 | Run No. 3 |
| This substance: | | | |
| (β-form) | 0.32 | 0.45 | 0.26 |
| (α-form) | 0.31 | 0.44 | 0.26 |
| Succinic acid, commercially available | 0.34 | 0.50 | 0.27 |
| Fumaric acid | 0.37 | 0.16 | 0.27 |
| Maleic acid | 0.31 | 0.44 | 0.26 |
| Gallic acid | 0.24 | 0.24 | 0.16 |
| Malonic acid | 0.16 | 0.39 | 0.13 |

The developing solvents used as follows:

| Run No. 1 | | Run No. 2 | | Run No. 3 | |
|---|---|---|---|---|---|
| Ethanol | 80 | Phenol | 80 | n-Propanol | 70 |
| Ammonia water | 4 | Water | 20 | Ammonia water | 30 |
| Water | 16 | | | | |

In each of the runs, the development was carried out at 20° C. for 15 hours, using Toyo filter paper No. 50 or 51 and bromo cresol green as coloring agent.

Physiological activity of this substance

When fresh fish meat, whale meat, bird and animal meat, and the internal organs thereof are immersed into a 0.1 to 0.05% aqeuous solution of this substance, the peculiar offensive odor disappears after immersion at an ordinary temperature for 2 to 6 hours or at 0° to 5° C. for 24 to 96 hours.

Fish or animal meat is digested with proteinase, and then indigestible residue and fat and fatty oils are removed therefrom. The resulting solution is adjusted with a 5 N KOH aqueous solution at a pH of 7.0 to 7.4, and this substance is added in an amount of 0.1 to 0.05% to them. While maintained at 70° to 100° C. for 60 minutes, the solution is readjusted at a pH of 7.6 to 8.0. After filtration, the filtrate is adjusted at a pH of 5.0 with 5 N HCl, and then concentrated to about one-fifth volume. The concentrate is added with about 1 or 2% starch, and then spray- or freeze-dried, whereby a deodorized powder containing a large amount of essential amino acids is obtained. Such powder is suited for the use of food.

A crude liquor removed of sodium glutamate crystals is adjusted at a pH of 7.0 to 7.2 by addition of 5 N KOH, and then heated up to 70° C. The liquor is added with 0.1 to 0.05% of the present substance, allowed to stand for 30 to 60 minutes, and then blown with sterile air for 10 to 20 minutes. Volatile, odoriferous materials mainly including dimethyl sulfite are liberated and purged away. The liquor thus treated is adjusted again at a pH of 7.6 to 8.0 with a KOH aqeuous solution and then filtered. Black sediment is removed. The filtrate is adjusted at a pH of 4.6 to 4.7 with 5 N HCl. Thus a deodorized solution removed of sodium glutamate crystals (or amino acids) is obtained. This liquid is quite suitable to soy-sauce additive.

Mucous odor and putrefied tissue odor are removed by washing the area with a 0.1–0.05% aqueous solution of this substance. Also toilet odor can be killed by addition of the said solution. The smell of armpit is prevented by applying an ointment containing 0.1 to 1.0% of this substance.

Toxic amines such as histamine, indole and scatole, when reacted with the substance, are converted to such compounds which are non-toxic and odorless.

The mechanism of the deodorizing action of the present compound may be explained as follows:

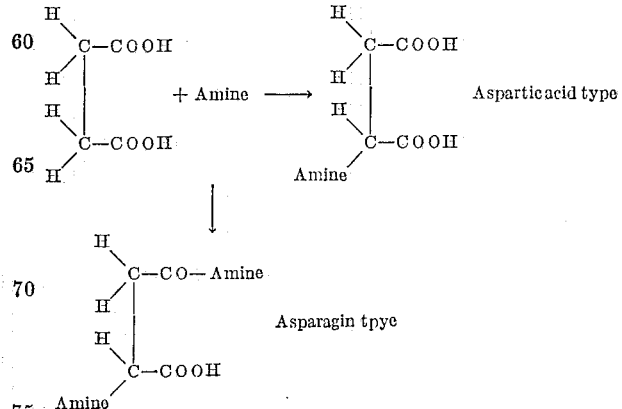

That is, when meat or fish is hydrolyzed, various kinds of amino-acids can be produced, but the hydrolysis solution may contain various amines as a by-product, which causes a characteristic odor of the meat or fish.

The Gauche form succinic acid can be easily reacted with these free amines at a room temperature to give aspartic acid type—or asparagin type products thereby inhibiting a characteristic deodorizing action. Such an action can not be found in the commercially available succinic acid.

What I claim is:

1. A process for producing cis-succinic acid of Gauche form, which comprises cultivating a strain of Saccharomyces genus in an aqueous, malt juice-containing solution under aerobic conditions at a temperature of from about 20° to about 35° C. for 72–120 hours, extracting cis-succinic acid of Gauche form with ether under day light shielding conditions, and distilling the ether extract in vacuo while shielding it from day light to give the crystals of cis-succinic acid of Gauche form.

2. A process according to claim 1, wherein said strain is selected from the group consisting of the strains of *Sacch. steineri* species, and *Sacch. cereviciae ellipsoideus* species.

3. A process for producing cis-succinic acid of Gauche form, which comprises cultivating a strain of *Saccharomyes steineri* var. *hara* ATCC No. 13688 in aqueous, malt juice-containing solution under aerobic conditions at a temperature of from about 20° to about 35° C. for 72–120 hours, extracting cis-succinic acid of Gauche form with ether under day light shielding conditions, and distilling the ether extract in vacuo while shielding it from day light to give the crystal of cis-succinic acid of Gauche form.

4. A process for producing cis-succinic acid of Gauche form, which comprises cultivating a strain of *Saccharomyces steineri* var. *hara* ATCC No. 13668 in an aqueous, malt-juice-containing solution under aerobic conditions at about 20°–35° C. for 72–120 hours, extracting cis-succinic acid of Gauche form with ether under day light shielding conditions, distilling off the solvent, adding with an aqueous solution of commercial succinic acid and a member selected from the group consisting of commercial maleic acid and commercial maleic anhydride, and distilling off water in vacuo to give a larger quantity of cis-succinic acid of Gauche form.

5. A process according to claim 4, wherein said cis-succinic acid of Gauche form is further purified by dissolving it in ether, treating with active charcoal and distilling off the solvent, under day light shielding conditions.

No references cited.

A. LOUIS MONACELL, *Primary Examiner.*

L. M. SHAPIRO, *Assistant Examiner.*